(12) United States Patent
Tiana (10) Patent No.: US 9,407,826 B1
(45) Date of Patent: Aug. 2, 2016

(54) SYSTEM FOR AND METHOD OF ADJUSTING A VISION SYSTEM

(71) Applicant: Carlo L. Tiana, Portland, OR (US)

(72) Inventor: Carlo L. Tiana, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/615,111

(22) Filed: Feb. 5, 2015

(51) Int. Cl.
| | |
|---|---|
| *G06T 15/00* | (2011.01) |
| *H04N 5/232* | (2006.01) |
| *G01S 13/95* | (2006.01) |
| *B64D 43/00* | (2006.01) |
| *B64D 47/08* | (2006.01) |
| *H04N 7/18* | (2006.01) |

(52) U.S. Cl.
CPC ............ *H04N 5/23293* (2013.01); *B64D 43/00* (2013.01); *B64D 47/08* (2013.01); *G01S 13/95* (2013.01); *H04N 7/185* (2013.01)

(58) Field of Classification Search
CPC .......... H04N 7/18; G08B 23/00; G08B 21/00; G06K 9/36; G06K 9/0063; G01C 21/00; G06F 7/70; G06F 3/012; G06F 3/013
USPC ................ 701/3, 120, 516; 340/995.1, 853.2, 340/853.3, 870.01, 870.02, 870.16; 244/100, 183, 3.15, 3.16, 3.17
See application file for complete search history.

(56) References Cited

U.S. PATENT DOCUMENTS

| | | | | |
|---|---|---|---|---|
| 7,205,928 B1* | 4/2007 | Sweet | .................... | G01S 13/953 342/118 |
| 7,525,448 B1* | 4/2009 | Wilson | .................... | G02B 27/01 340/461 |
| 7,617,022 B1* | 11/2009 | Wood | .................... | G02B 27/01 340/447 |
| 2008/0180351 A1* | 7/2008 | He | .......................... | G01C 23/00 345/1.1 |
| 2012/0035789 A1* | 2/2012 | He | ......................... | G01C 23/005 701/16 |
| 2012/0147030 A1* | 6/2012 | Hankers | ................... | G01W 1/00 345/619 |

* cited by examiner

*Primary Examiner* — Dalena Tran
(74) *Attorney, Agent, or Firm* — Donna P. Suchy; Daniel M. Barbieri (57) ABSTRACT

A method or apparatus can be used with an aircraft or other vehicle. The apparatus can include or the method can use processing electronics configured to receive weather and airfield data associated with a weather report and configured to: 1. adjust at least one operational parameter of the vision system in response to the received weather report and airfield data; 2. adjust a display of an image derived from vision system data from vision system and synthetic vision data from a synthetic vision system in response to the data associated with the weather report detect; or 3. perform both operations 1 and 2.

20 Claims, 6 Drawing Sheets

SYSTEM FOR AND METHOD OF ADJUSTING A VISION SYSTEM

BACKGROUND

The present disclosure relates generally to aircraft sensing and/or display systems. The present disclosure more specifically relates to an apparatus for and method of adjusting at least one parameter associated with displaying an image from a vision system, such as an enhanced vision system.

Displays are used in various applications. For example, avionic and other vehicular systems use head down display (HDD) systems, head up display (HUD) systems including but not limited to wearable displays, such as, helmet mounted display (HMD) systems. In aircraft applications, HUD and HDD systems advantageously display information from aircraft systems and sensors in a graphical and alphanumeric format. The display information can include an enhanced vision image from a vision system (e.g., camera or other imaging sensor (such as a visible light imaging sensor, infrared imaging sensor, millimeter wave radar imager, or combinations thereof)).

Vision systems, such as enhanced flight vision systems (EFVSs), are often utilized by pilots in high workload situations, such as during the final stages of approach and landing. The vision system is used to view the runway or helipad often in very demanding low visibility conditions. Infrared cameras and light sensors used by conventional enhanced vision systems can have a limited ability to penetrate certain challenging low visibility conditions when not tuned properly for the conditions. This limited ability is often exacerbated because pilots have very little time to tune the enhanced vision system for maximum performance in the conditions once they become aware of the conditions at the airport.

In conventional systems, the pilots may have to set mode switches for day or night visible flight rules conditions and low visibility conditions. However, these modes do not distinguish between the wide variety of conditions that the environment can present and are therefore less precise and less useful for camera optimization. Further, the mode switches have to be manually set by the pilot during high workload periods in the cockpit.

Accordingly, there is a need for systems for and methods of automatically adjusting at least one camera in a vision system for environmental conditions. There is still a further need for systems for and methods of adjusting vision systems for a wide variety of weather, light, and/or runway light and surface conditions. Yet further, there is a need for adjusting display systems and/or vision systems, such as, enhanced vision systems, in accordance with a weather report available in the cockpit. Still further, there is a need for a system that automatically adjusts a vision system in response to a weather report. Yet still further, there is a need to automatically increase the effectiveness of an image provided by a vision system using information associated with an environment.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

In one aspect, the inventive concepts disclosed herein are directed to a method or apparatus that can be used with an aircraft or other vehicle. The apparatus can include or the method can use processing electronics configured to receive weather data associated with a weather report. The processing electronics can also be configured to: 1. adjust at least one operational parameter of the vision system in response to the weather data associated with the weather report; 2. adjust a display of an image derived from the sensed data from the vision system and the synthetic data from a synthetic vision system, in response to the weather data associated with the received weather report; or 3. adjust at least one operational parameter of the vision system in response to the weather data associated with the weather report and adjust the display of the image derived from the vision system data from the vision system and the synthetic vision data from the synthetic vision system in response to the weather data associated with the weather report.

In another aspect, the inventive concepts described herein are directed to a combination of vision system components used for a particular operation that may also be altered in response to a specific weather report; for example, a multispectral vision system may be reconfigured to use only certain components of that system with the knowledge that in the reported weather conditions specific subsystems are more or less effective.

In another aspect, the inventive concepts disclosed herein are directed to a method of using weather data on an aircraft. The method includes receiving the weather data from a wireless communication system, adjusting image data representing an environment outside the aircraft aboard the aircraft in response to the weather data. The image is derived at least in part from camera data from a camera system. The method also includes providing an image on an electronic display in the aircraft at least partially in response to the weather data.

In yet another aspect, the inventive concepts disclosed herein are directed to a vision system for a vehicle. The vision system includes means for receiving weather data or runway light and surface information and means for adjusting image data derived at least in part from operation of a camera. The image data is adjusted at least in part in response to the weather data or the runway light information.

In some embodiments, the runway light information can include runway light geometry or runway light technology in use (for example incandescent or LED-based) or other information specific to an airport or helipad being approached (as might be the case for data-linked approach charts and airfield charts).

BRIEF DESCRIPTION OF THE DRAWINGS

The disclosure will become more fully understood from the following detailed description, taken in conjunction with the accompanying drawings, wherein like reference numerals denote like components, and.

DETAILED DESCRIPTION OF THE EXEMPLARY EMBODIMENTS

Before describing in detail the particular improved system and method, it should be observed that the invention includes, but is not limited to, a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

According to some exemplary embodiments, a vision system, such as, an enhanced vision system, can be used to provide an image that is automatically adjusted in accordance with environmental conditions, such as weather, the presence of sunlight, moon light, lighting types, etc. In some embodiments, camera parameters, such as, exposure time, spectral sub-band relative weighting, gain, spatial prioritization, and/or temporal filtering are adjusted in response to time of day, runway light pattern, runway surface type, or runway light type, weather report, location, time of year, and/or altitude. In some embodiments, at least one weighting parameter for blending synthetic vision data and camera image data is adjusted in response to time of day, runway light type, weather report, location, time of year, and/or altitude. In some embodiments, weighting parameters for different types of sensors (e.g., infrared, radio frequency, or visual light sensors) are adjusted in response to time of day, runway light type, weather report, location, time of year, and/or altitude. In some embodiments, location, time of day and time of year are utilized to make adjustments in accordance with sun light and/or moon light if the sky is clear.

In some embodiments, a weather report is wirelessly provided to the aircraft or other vehicle. The weather report is translated into weather data for making adjustments for the display of an image of the environment. In some embodiments, the weather report is a text-based weather report (e.g., a Meteorological Aerodrome Report (METAR) report or Automated Surface Observing Systems (ASOS) report. In some embodiments, information otherwise received by the aircraft via radio or data link methods may be translated and, for example, provided as ARINC 429 messages to transmit to the camera for making adjustments to the image. For example, the miles of visibility in the METAR report can be translated to a visibility level or parameter, and the cloudiness message in the METAR report, the time of year, the location and the time of day can be translated into a brightness level. Other parameters can be derived from the weather report in some embodiments.

In certain embodiments, the systems and methods can be utilized as extension to an enhanced flight vision systems and/or combination enhanced vision systems and synthetic vision systems. In some embodiments, the camera performance in a vision system is automatically increased based upon an actual weather report without requiring significant additional equipment on the aircraft. The camera and image display performance can be adjusted to accommodate a wide variety of weather, light, and other conditions.

In certain embodiments, the information provided by the weather report and other data can be used not only to configure the vision system for the particular conditions, but also to predict the actual performance of the camera in the conditions, and provide that quantified performance estimate to the flying crew or the aircraft dispatch crew, for the purposes of dependable, defined-outcome and therefore safer and more efficient operations.

Figure 1:
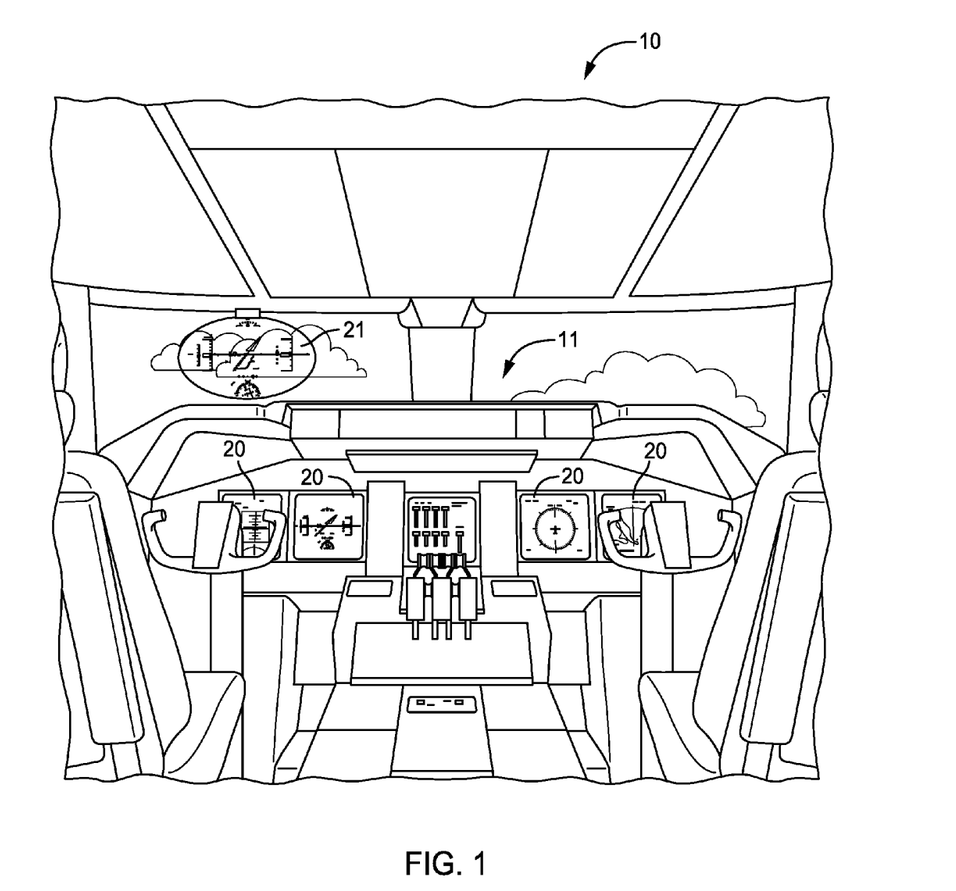
FIG. 1 is a schematic illustration of an aircraft control center or cockpit, according to an exemplary embodiment.

With reference to FIG. 1, an aircraft 10 includes a cockpit or an aircraft control center 11. Aircraft control center includes flight displays 20 embodied as head down displays (HDD5). Aircraft control center 11 can also include a combiner 21 associated with a head up display (HUD) system. In one embodiment, combiner 21 is provided as part of a wearable HUD. Conformal images are provided on combiner 21.

Flight displays 20 can be used to provide information to the flight crew, thereby increasing visual range and enhancing decision-making abilities. In an exemplary embodiment, flight displays 20 and combiner 21 can include a weather display, a joint display, a weather radar map and a terrain display. Further, flight displays 20 and combiner can include a synthetic vision system (SVS) image or an enhanced vision system (EVS) image (e.g., an EFVS image) or a merged image derived from the SVS image and the EVS image in some embodiments. For example, flight displays 20 and combiner 21 can be configured to display a three dimensional or perspective image of terrain and/or weather information. Other views of terrain and/or weather information may also be provided (e.g., plan view, horizontal view, vertical view, or combinations thereof). Additionally, flight displays 20 and combiner 21 can be implemented using any of a variety of display technologies, including CRT, LCD, organic LED, dot matrix display, and others.

According to an exemplary embodiment, at least one of displays 20 or combiner 21 is configured to provide an image of the environment associated with aircraft 10 (e.g., during approach and landing) or taxiway (e.g., while taxiing). In one embodiment, at least one of displays 20 or combiner 21 displays a merged image of the environment derived from two or more sources of image data, radar data, and SVS data. The image is adjusted using a weather report, lighting data, or in accordance with runway lights according to one or more embodiments.

Figure 2:
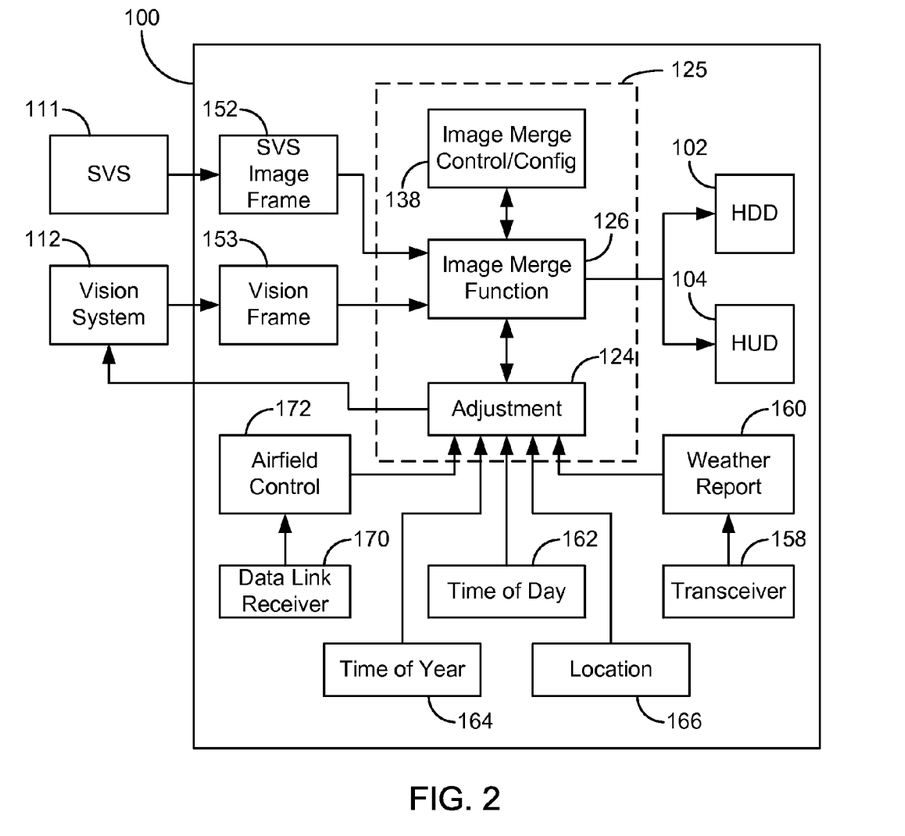
FIG. 2 is a schematic general block diagram of a display system for displaying an image derived at least in part from a vision system, according to an exemplary embodiment.

Referring to FIG. 2 a display system 100 can be utilized for providing an image to any of displays 20 or combiner 21 (FIG. 1). One of displays 20 can be a head down display, such as, a head down display (HDD) 102, and combiner 21 can be part of a head up display system, such as, a head up display (HUD) 104. Display system 100 is in communication with a vision system (VS) 112 (e.g., an enhanced vision system) and a synthetic vision system (SVS) 111.

SVS 111 is optional in some embodiments. In some embodiments, VS 112 is an enhanced vision system manufactured by Rockwell Collins (e.g., an EVS 3000 system) or a suitable alternative. In some embodiments, SVS 111 is a synthetic vision system manufactured by Rockwell Collins (e.g., a Pro Line 21 system) or a suitable alternative.

In some embodiments, display system 100 includes a processor 125 including an adjustment module 124, an image merge function module 126, and an image merge control/configuration module 138. In some embodiments, display system 100 includes a memory 153 for storing a vision frame from VS 112, a memory 152 for storing a synthetic vision frame from SVS 111, a communication unit or transceiver 158, a weather report module 160, a time of day module 162, a time of year module 164, and a location module 166. Processor 125 can be any type of computer, digital signal process, graphics processor, computing device, or combination thereof. Display system 100 can also include a data link receiver 170 and an airfield configuration module 172.

Processor 125 is configured to adjust an image provided on HDD 102 or HUD 104 in response to the weather report received by weather report module 160 or in response to the type of runway lights provided by airfield configuration module 172 (e.g., in response to location module 166). Upon receipt of the weather conditions and/or type of runway lights, processor 125 can adjust the image in at least three ways: 1. configure settings using adjustment module 124 for improved effectiveness of the VS image in the specific conditions expected, 2. merge the image from memory 153 with the image from memory 152 according to a blending factor configured to improve the effectiveness of the blended image provided by image merge function module 126, or 3. provide the operations of both operations 1 and 2 above. The blending factor can be continually adjusted in response to altitude of aircraft 10 in some embodiments.

Adjustment module 124 is hardware (e.g., a processor) or software configured to provide a blending parameter for image merge function module 126 and camera adjustment control signals for VS 112 in some embodiments. Image merge function module 126 is hardware (e.g., a processor) or software configured to provide a blending of image data from memories 152 and 153 in response to the blending parameter in some embodiments. Memories 152 and 154 are frame memories or other storage devices.

Adjustment module 124, image merge function module 126, image merge control/configuration module 138, weather report module 160, time of day module 162, time of year module 164, location module 166, and airfield configuration module 172 can be embodied as software modules operating on a computing platform or processor 125 and can be stored on a non-transitory medium. Processor 125 can be part of or integrated with a radar system, SVS 111, VS 112, a HDD display computer for HDD 102, or a HUD computer for HUD 104 in certain embodiments. In one embodiment, processor 125 is an independent platform. In one embodiment, processor 125 is integrated with a camera for VS 112.

Time of day module 162 and time of year module 164 can receive information from clock with a calendar function. Location module 166 can be any device for determining the location of aircraft including a global position system (GPS) receiver, an inertial navigation (INS) system, etc. Time of day module 162 and time of year module 164 can determine sun or moon position for determining brightness qualities of the environment of aircraft 10. Modules 162 and 164 can make determine a brightness parameter using weather parameters from weather report module 160.

Location module 166 can also provide information or data related to the type of runway lights associated with the airport location in some embodiments. Display system 100 can be tuned to the type of runway lights (e.g., the wavelength of the runway lights) in some embodiments. Location module 166 includes a database of approach, runway or taxiway light and other parameters for each airport referenced by location in some embodiments.

Weather report module 160 receives the weather report from transceiver 158 in some embodiments. Weather report module 160 is a combination of hardware and software for receiving a weather report for use by display system 100 in some embodiments. Transceiver 158 is an aircraft communications addressing and reporting system (ACARS) unit, a data radio, satellite radio, cellular phone, or other wireless device in some embodiments. Data link receiver 172 is a wireless communication unit, such as, a data radio, satellite radio, cellular phone, etc. for providing airfield information in some embodiments. Airfield configuration module 172 can receive information from transceiver 158 in some embodiments.

The weather report is a text-based weather report (e.g., a Meteorological Aerodrome Report (METAR) report or Automated Surface Observing Systems (ASOS) report provided as ARINC 429 messages) in some embodiments. For example, a METAR or ASOS weather reports that pilots are required to obtain in advance of an approach can be used.

An exemplary report is below:
METAR KSFO 230456Z 30012KT 10SM FEW008 14/11 A3002 RMK AO2
SLP166 T01390111=.

This report can be translated into weather data indicating a clear day, with a 12 kts wind at 300 deg., 10 Statute Miles visibility, FEW clouds, 14 degree C. temp, 11 degree C. dew point, etc.). Another exemplary report is below:
METAR KFSM 101553Z 08003KT 1/4SM R25/1400V2200FT FG VV002
06/06 A3008 RMK AO2 SLP187 T00610056=.

This report can be translated into weather data indicating a ¼ statute mile visibility due to FOG with VV vertical Visibility of 200' and horizontal visibility of 1400-2200'. METAR reports can contain all the relevant characteristics of weather (type, density, visibility, temperature, dew point, wind, pressure) that can affect the camera performance of VS 112. In some embodiments, the weather report can be a SIRIUS® satellite weather feed, or weather feeds from Ascend/Wilkins weather services, NEXRAD service, and other data link methods.

In some embodiments, the weather reports are communicated to VS 112 electronically and automatically (either by parsing at the origin into messages (e.g. ARINC 429 messages), or by passing the string to the camera for parsing internally). For example, the miles of visibility in the METAR report can be translated to a visibility level or parameter, and the cloudiness message in the METAR report, the time of year, the location and the time of day can be translated into a brightness level. Snow accumulation on the ground can also be used to provide a brightness level. Camera parameters, such as, exposure time, gain, etc. can be adjusted in response to the brightness level.

Weather report module 160 translates the weather report to weather data for use by processor 125 in some embodiments. The weather report can be translated to provide one or more of a visibility parameter, snow parameter, density parameter, humidity parameter, dew point parameter, pressure parameter, etc. A visibility level can be provided in response to one or more of the visibility parameter, snow parameter, density parameter, humidity parameter, dew point parameter, pressure parameter, etc. Camera parameters, such as, exposure time, gain, etc. can be adjusted in response to the visibility parameter.

In some embodiments, information from electronic approach plates, incorporating for example the type of approach lighting system, the nature of the light sources in that approach lighting system (LED or incandescent) etc. is used to tune or adjust display system 100. For example, a color filter wheel in VS 112 can be set according to the nature of the light sources at the particular runway for night time landings. The information can be provided by airfield configuration module 172 and can be based upon light type, light pattern, surface material, etc.

In some embodiments, adjustment module 124 uses a look up table to provide the blending parameter using visibility and altitude, using visibility, altitude, and position of the sun or moon with respect to aircraft 10, using a cloudiness parameter and altitude, using the brightness level, using the visibility level, etc. A position parameter from location module 166 and a time of day and date from modulus 162 and 164 can be used to determine if aircraft is in a night time or daytime environment. Visibility or cloudiness can be used to determine if the sun or moon needs to be considered when determining the blending factor or camera parameters. For example, sun position is not considered at night time or in heavily clouded conditions. In another example, a gain parameter or exposure time for the camera can be reduced or a filter can be applied in bright conditions or conditions where the sun or moon is directed at the camera.

In another example, VS 112 can be tuned for a type of fog or precipitation. Larger particles associated with fog or precipitation are generally penetrated with light of shorter wavelengths, and smaller particles associated with fog or precipitation are generally penetrated with light of larger wavelengths. When the fog condition is a heavy dense fog or precipitation with larger particles, the camera can be configured for larger wavelengths in some embodiments. Temperature can provide an indication of whether the fog has large particles or small particles (e.g., colder temperatures indicate smaller particles). When the fog condition is a low density fog or precipitation with smaller particles, the camera can be configured for smaller wavelengths in some embodiments. In some embodiments, blending between cameras or sensors operating at different wavelengths can be selected in response to the weather data indicating types of fog conditions or precipitation. In some embodiments, a filter wheel is set according to the precipitation condition—filtering the camera input according to the most penetrating band of wavelength in some embodiments. In some embodiments, wind and snow parameters can indicate blowing snow. Infrared or lower frequency can be chosen in the event of blowing snow in some embodiment.

In some embodiments, display system 100 can adjust the blending factor to be more heavily weighted to the SVS image at altitudes above a threshold. In some embodiments, adjustment module 124 selects an SVS feed from memory 152 on a preferred basis (e.g., over 70 percent) over the VS feed from memory 153 at altitudes greater than about 200', with the weighting shifting towards the VS feed at lower altitudes. The initial blending factor can be selected based upon weather conditions and can be stepped down to weight different portions of the system more or less heavily with the image from VS 112 as altitude decreases. In one embodiment, the altitude of cloud cover or vertical visibility level from the weather report serves as a threshold at which the blended image is more heavily weighted with the image from VS112.

Display system 100 is able to perform real time or near real time fine tuning of images provided by VS112 through the approach which would be very difficult for a pilot or co-pilot to perform. Automatic adjustment advantageously frees the pilot and co-pilot for other operations and yet allows the pilot or co-pilot to receive an image with better image quality in some embodiments. Time of day, sun position, and other information are also available for display system 100 to fine tune system operation.

In some embodiments, adjustment module 124 uses runway information and/or weather reports to tune or adjust camera parameters, including but not limited to: exposure time, spectral sub-band relative weighting, image processing parameters (gain, spatial prioritization, temporal filtering, etc.), weighting towards synthetic/sensed solution, and other weighting. In some embodiments, image merge function module 126 blends images from two or more vision systems (e.g., visual and infrared, RF, weather radar, etc.) or two or more types of sensors or arrays in VS 112. In some embodiments, the blending factor for multiple vision systems or multiple sensors is chosen using a runway light, helipad light or airfield parameter, a weather parameter, or both. The blending factor can be continually adjusted in response to altitude of aircraft 10 in some embodiments. In some embodiments, the blending of images from two or more vision systems can be performed in conjunction with one or both of operations 1, 2, and 3 discussed above.

In one embodiment, a radar system can be an image source for display system 100. Images from the radar system can automatically be chosen over images from VS112 in response to range, altitude, and weather conditions. For example, in heavy fog, an image from the radar system is chosen over an image form a visible light sensor or camera. The radar system can be an X-band or M-band weather radar system or a non-weather radar sensor.

According to one embodiment, SVS 111 can be any electronic system or device for providing a computer generated image of the external scene topography. The image can be from the perspective of the aircraft flight deck as derived from aircraft attitude, high-precision navigation solutions, and a database of terrain, obstacles and relevant cultural features. According to one embodiment, VS 112 can be any electronic system or device for providing a sensed image of the external scene topography. VS 112 can be an infrared or visual camera in one embodiment.

Processor 125 via image merge function module 126 executes a fusion processing algorithm for fusing the frames from memory 52, memory 53, and optionally other systems (e.g., radar systems) provided as video signals. This fusion process may include special formatting (positioning, sizing, cropping, etc.) of specific features or the entire image from a specific image source based on other sensor inputs or aircraft. After the combined or fused image has been completed, the entire image is sized to fit appropriately within the total HUD field-of-view and conformally overlay the outside scene, which is viewed through combiner 21 of HUD 104. In addition, the overall fused image contrast is standardized with the brightness/contrast to support the brightness/contrast controls of HUD 104.

Image merge control configuration module 138 can provide format adjustments to data. SVS 111 and HUD 102 can have their own specific interface type and format. Also, each display of displays 20 and combiner 21 (FIG. 1) may require specific formatting. A standard format can be a format used in HUD processing functions. Module 138 can be implemented in hardware, software, or combinations thereof.

Figure 3:
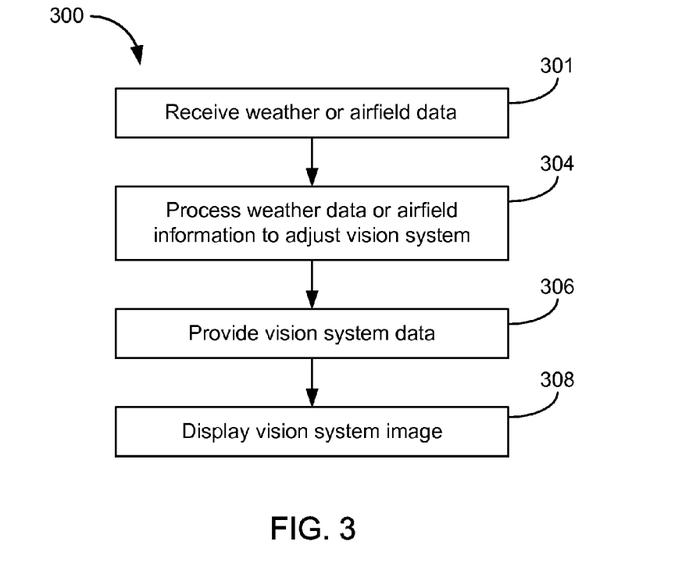
FIG. 3 is a flow diagram showing an exemplary process used by the system illustrated in FIG. 2, according to a further exemplary embodiment.

With reference to FIG. 3, a flow 300 is performed by display system 100 for presenting an image on displays 20 and/or combiner 21 in one embodiment. At an operation 301, processor 125 receives a weather report from weather module 160 via transceiver 158 or runway or helipad information from module 172. At an operation 304, the weather report is processed to adjust VS 112 using adjustment module 124 in some embodiments. The weather report or the runway or helipad information is processed to provide weather data or other data, which is used to make adjustments to camera settings in VS 112 in some embodiments. A brightness level or visibility level derived from the weather report and other parameters is used to adjust the camera settings in some embodiments. The following camera settings can be adjusted or set according to the weather data or weather report in some embodiments: exposure time, spectral sub-band relative weighting, gain, spatial prioritization, and temporal filtering parameters. The camera parameters can also be adjusted for time of day, time of year, and runway lights at a location.

At an operation 306, an image from VS 112 is provided to display 20 and/or combiner 21 (FIG. 1) in some embodiments. The image can be blended with other camera images or an image from SVS 111. After operation 310, flow 300 can return to operation 301 or 304.

Figure 4:
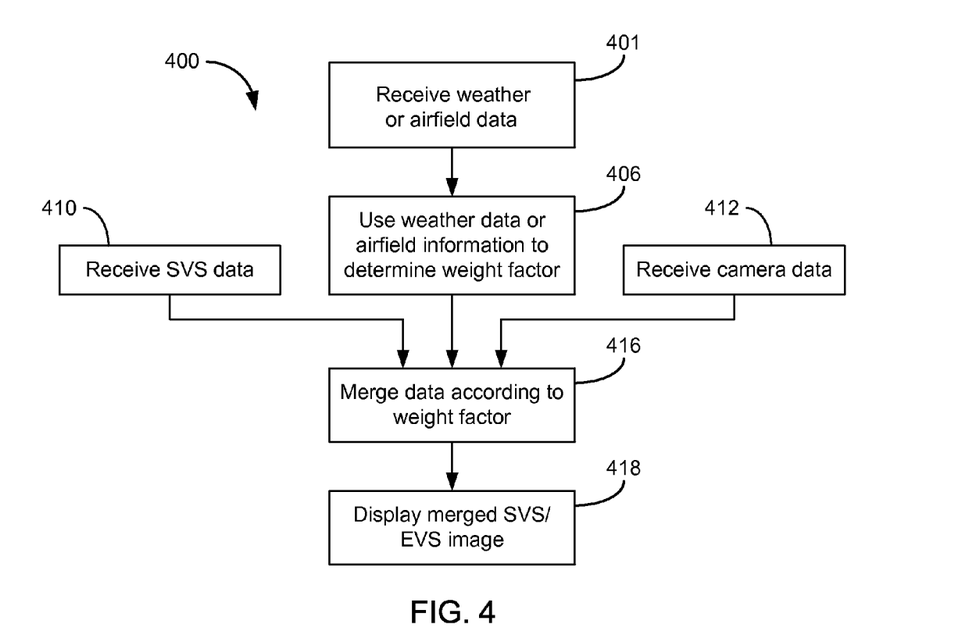
FIG. 4 is a flow diagram showing another exemplary process used by the system illustrated in FIG. 2, according to a further exemplary embodiment.

With reference to FIG. 4, a flow 400 is performed by display system 100 for presenting an image on displays 20 and or combiner 21 in some embodiments. At an operation 401, processor 125 receives a weather report from weather module 160 via transceiver 158. At an operation 406, the weather report is processed to adjust a blending parameter by image or runway or helipad information from module 172 merge function module 126. The weather report is processed to provide weather data by weather report module 160 in some embodiments. The weather data or runway or helipad information is used by adjustment module 124 to provide the blending parameter to image merge function module 126. The blending parameter can be adjusted in response to altitude of aircraft 10. In some embodiments, the blending parameter is adjusted in real time in accordance with altitude provided by location module 166 and the weather report.

At an operation 410, image data from SVS 111 is received by image merge function module 126. At an operation 412, image data from SVS 111 is received by image merge function module 126. The image data is blended in accordance with the weather data at an operation 416 using the blending parameter.

At an operation 418, the blended image is provided to display 20 and/or combiner 21 (FIG. 1) in some embodiments. The image can also be blended with other camera images in some embodiments. After operation 408, flow can return to operation 406, 410, or 412.

Figure 5:
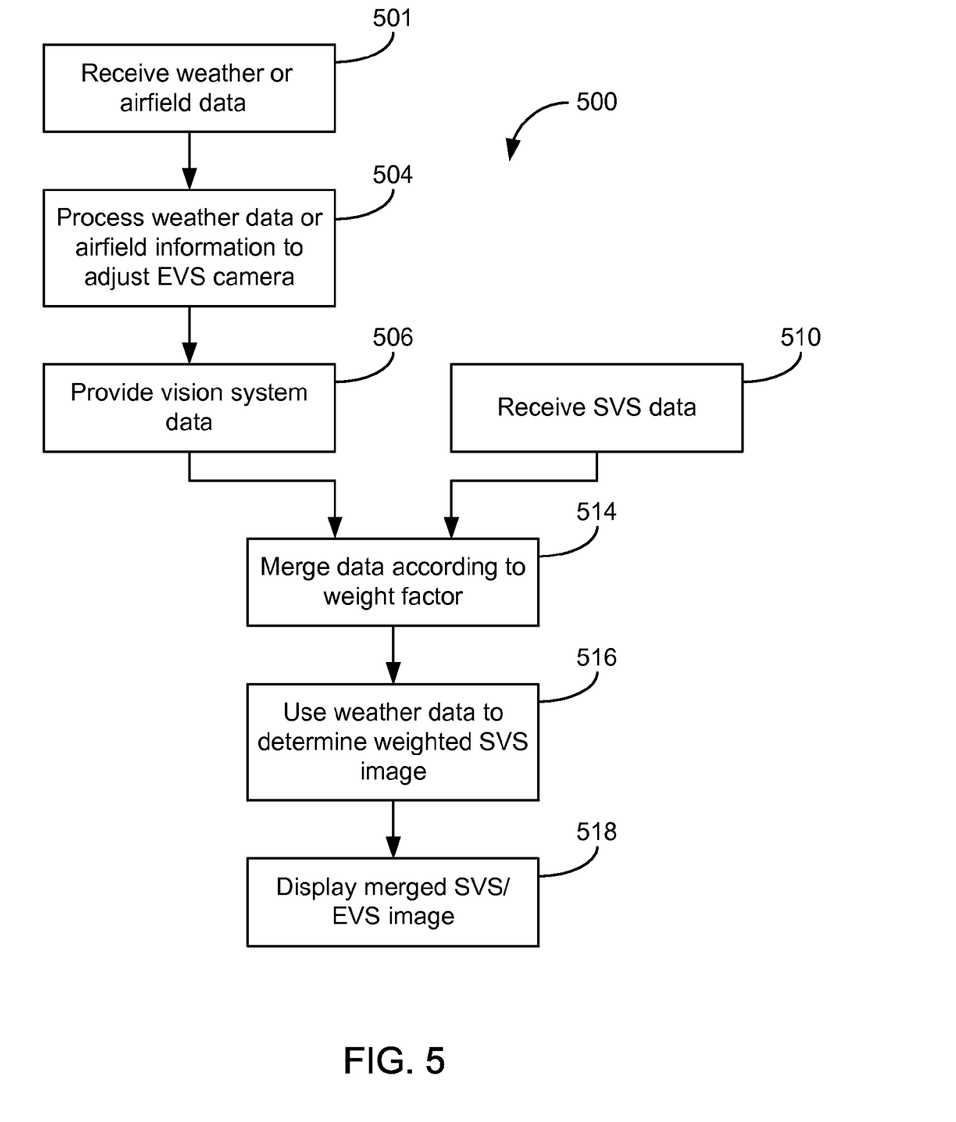
FIG. 5 is a flow diagram showing a further exemplary process used by the system illustrated in FIG. 2, according to a further exemplary embodiment.

With reference to FIG. 5, a flow 500 is performed by display system 100 for presenting an image on displays 20 and or combiner 21 in one embodiment. Flow 500 is similar to flow 300 and flow 400. At an operation 501, processor 125 receives a weather report from weather module 160 via transceiver 158. At an operation 504, the weather report is processed to adjust VS 112 using adjustment module 124 in some embodiments. The weather report is processed to provide weather data which is used to make adjustments to camera settings in VS 112 in some embodiments. Alternatively, airfield in formation can be processed for adjustments. For example, light types or runway surface can be used to select brightness or wavelength response in some embodiments. The reflectivity of the runway surface, the color of the runway surface, the brightness of the lights, the number of lights, the wavelength range of the lights, etc. can be used to select camera settings in some embodiments. The following camera settings can be adjusted or set according to the weather data or weather report in some embodiments: exposure time, spectral sub-band relative weighting, gain, spatial prioritization, and temporal filtering parameters. The camera parameters can also be adjusted for time of day, time of year, and runway lights at a location.

At an operation 506, an image from VS 112 is provided to image merge function module 126 in some embodiments. The image can be blended with other camera images or an image from SVS 111. At an operation 510, an image from SVS 111 is received by image merge function module 126

At an operation 514, the weather data or airfield information is used by adjustment module 124 to provide a blending parameter to image merge function module 126. The blending parameter can be adjusted with altitude of aircraft 10. In some embodiments, the blending parameter is adjusted in real time in accordance with altitude provided by location module 166. The image data is blended the blending parameter.

At an operation 518, the blended image is provided to display 20 and/or combiner 21 in some embodiments. The image can also be blended with other camera images in some embodiments. After operation 518, flow 500 can return to operation 504, 506, or 514.

Processor 125 can be any hardware and/or software processor or processing architecture capable of executing instructions and operating on navigational and image data. Processor 125 can be capable of determining navigational information such as altitude, heading, bearing, and location based on data from aircraft sensors for use in adjustments to images. Applicants note that flows 300, 400 and 500 and image adjustment can be performed in various equipment on aircraft 10 including in a HUD computer, a display processor, a radar system, a navigation system, VS 112, SVS 111, etc. in accordance with an exemplary embodiment.

Figure 6:
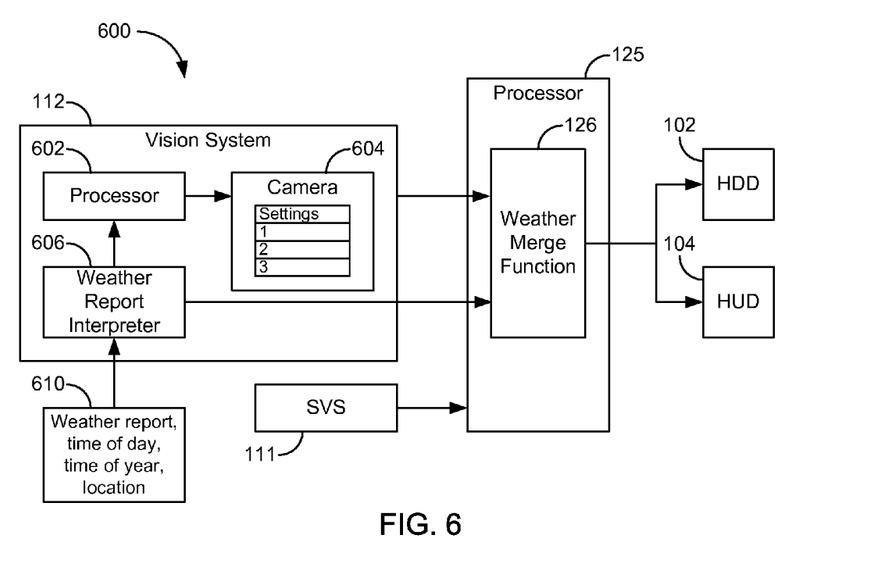
FIG. 6 is block diagram of a display system for displaying an image derived at least in part from a vision system, according to another exemplary embodiment.

With reference to FIG. 6, a display system 600 is similar to display system 100. Display system 600 includes VS 112. VS 112 includes a processor 602, at least one camera 604, and a weather report interpreter 606. A weather report 610 along with position, time of day and time of year information can be provided to weather report interpreter 606. Processor 602 can be a computing device in VS 112 or camera 604 and is configured to adjust settings for camera 604 in accordance with data from weather report interpreter 606. The settings include but are not limited to: exposure time, spectral sub-band relative weighting, gain, spatial prioritization, and temporal filtering parameters in some embodiments. In some embodiments, blending of images from multiple cameras can be chosen based upon data from weather report interpreter 606.

Figure 7:
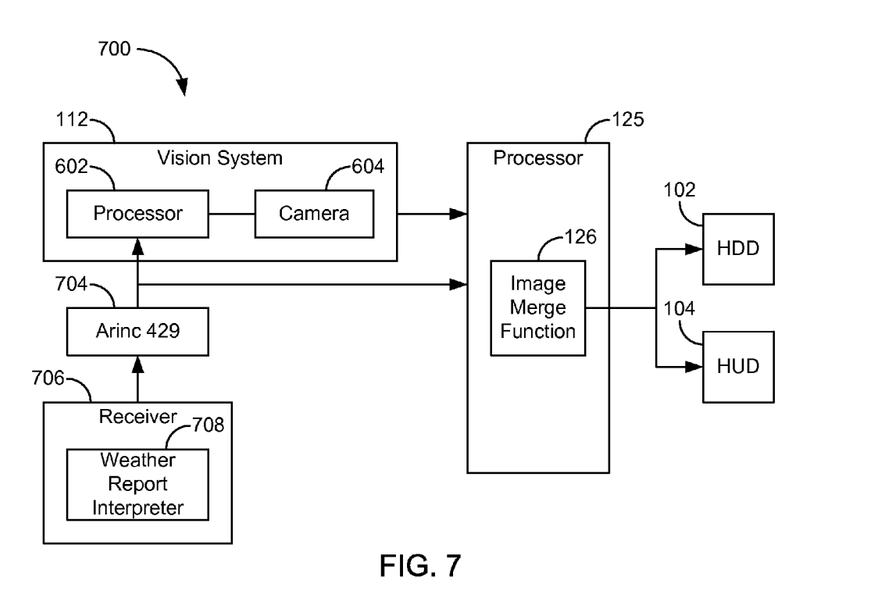
FIG. 7 is block diagram of a display system for displaying an image derived at least in part from a vision system receiving information from a bus, according to yet another exemplary embodiment.

With reference to FIG. 7, a display system 700 is similar to display systems 100 and 600. Display system 700 includes VS 112. VS112 includes processor 602 and at least one camera 604. Display system 700 also includes a receiver 706 and an ARINC 429 bus 704. Bus 704 is configured to provide ARINC 429 messages to processor 125 and processor 602. Receiver 706 is a wireless communication unit that includes a weather report interpreter 708.

Weather data related to the weather report along with position, time of day and time of year information can be provided by weather report interpreter 708 on bus 704 to processor 602 and processor 125 in some embodiments. Settings for camera 604 and blending by image merge function module 126 can be provided using the information provided on bus 704.

Figure 8:
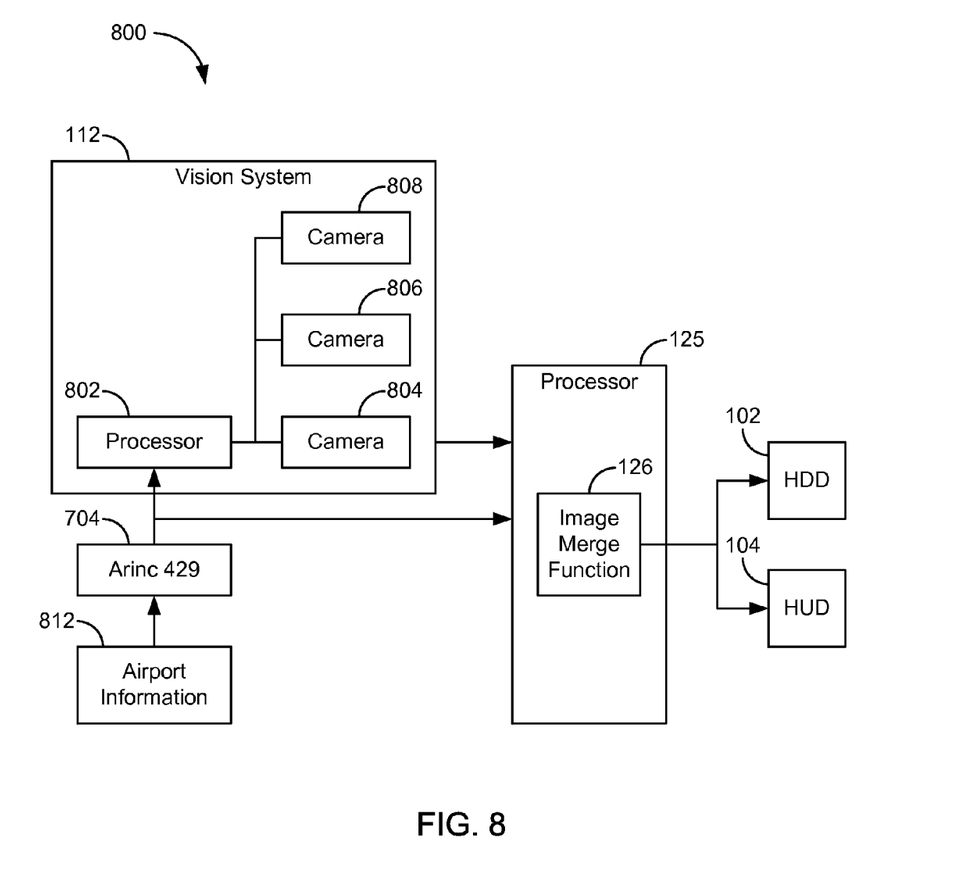
FIG. 8 is a block diagram of a display system for displaying an image derived at least in part from a vision system including multiple sensors or cameras, according to yet another exemplary embodiment.

With reference to FIG. 8, a display system 800 is similar to display systems 100 600 and 700. Display system 800 includes VS 112. VS 112 includes processor 802 and cameras or sensors 804, 806, and 808. Each of sensors 804, 806, and 808 are configured to sense light in a different wavelength band (e.g., visible light to long wave infrared) in some embodiments. Display system 800 also includes an airfield information source 812 and an ARINC 429 bus 704. Airfield information source 812 can be a data link radio or database for providing information related to the airfield that is being approached in some embodiments. The information can include runway light geometry or runway light technology in use (e.g., incandescent or LED-based) or other information specific to an airport or helipad being approached (e.g., information in data-linked approach charts and airfield charts).

Bus 704 is configured to provide ARINC 429 messages containing the runway information to processor 125 and processor 602. One of sensors 804, 806, and 808 can be selected based upon the airfield information in some embodiments. For example, processor 602 can select camera 804 tuned for short wave infrared when the runway lights are incandescent as opposed to a visible light or long wave infrared camera. In another example, processor 602 can blend and weight two or more cameras 804, 806 and 808 in response to the airfield information.

While the detailed drawings, specific examples, detailed algorithms, and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the image and processing devices. For example, the type of system components and their interconnections may differ. The systems and methods depicted and described are not limited to the precise details and conditions disclosed. The flow charts show exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. An apparatus for use with an aircraft comprising a vision system, the apparatus comprising:
   processing electronics configured to receive weather data associated with a weather report and configured to: 1. adjust at least one operational parameter of the vision system in response to the weather data associated with the weather report; 2. adjust a display of an image derived from vision system data from the vision system and synthetic vision data from a synthetic vision system in response to the weather data associated with the weather report; or 3. adjust at least one operational parameter of the vision system in response to the weather data associated with the weather report and adjust the display of the image derived from the vision system data from the vision system and the synthetic vision data from the synthetic vision system in response to the weather data associated with the weather report.

2. The apparatus of claim 1, wherein the processing electronics is configured to adjust at least one operational parameter of the vision system in response to the weather data associated with the weather report and adjust the display of the image derived from the vision system data from the vision system and the synthetic vision data from the synthetic vision system in response to the weather data associated with the weather report.

3. The apparatus of claim 2, wherein the weather report is a Meteorological Aerodrome Report (METAR) report or Automated Surface Observing Systems (ASOS) report.

4. The apparatus of claim 3, wherein the processing electronics translates the weather report into the weather data associated with the weather report.

5. The apparatus of claim 4, wherein the weather data comprises a time of day or year.

6. The apparatus of claim 1, wherein the weather data is used to provide a visibility level parameter for adjusting the at least one operational parameter or the display.

7. The apparatus of claim 1, wherein the weather data includes a time of day parameter indicative of a current time of day, and wherein the at least one operational parameter of the vision system is adjusted based on the current time of day.

8. The apparatus of claim 1, wherein the processing electronics is configured to adjust at least one operational parameter of the vision system in response to the weather data associated with the vision system including a filter, and wherein the at least one operational parameter comprises a response of the filter.

9. The apparatus of claim 1, wherein the vision system is an enhanced vision system and the display is provided on a head down display or head up display.

10. A method of using weather data or airfield information on an aircraft, the method comprising:
    receiving the weather data or airfield information from a wireless communication system;
    adjusting image data representing an environment outside the aircraft aboard the aircraft in response to the weather data or the airfield information the image data being derived at least in part by data from a camera system; and
    providing an image on an electronic display in the aircraft at least partially in response to the image data;
    wherein adjusting the image data includes continually adjusting the image data in real-time based on the weather data.

11. The method of claim 10, wherein the image data is adjusted within the camera.

12. The method of claim 10, further comprising:
    adjusting the image data in response to time of day data.

13. The method of claim 12, wherein the image data is adjusted by adjusting a blend of camera data and synthetic vision data used to provide the image data.

14. The method of claim 13, further comprising:
    receiving a text-based weather report from a wireless source and providing the weather data in response to the text based weather report.

15. The method of claim 14, wherein the electronic display is a head up display and the camera system is an enhanced vision system and the airfield information is light type or runway surface material.

16. The method of claim 14, wherein the text-based weather report is a Meteorological Aerodrome Report (METAR) report or Automated Surface Observing Systems (ASOS) report provided as ARINC 429 messages.

17. The method of claim 16, wherein the image data is adjusted by adjusting a weight of camera data to synthetic data in the image data, wherein the weight is adjusted in response to altitude.

18. A vision system for a vehicle, the vision system comprising:
    means for receiving weather data or runway light information; and
    means for adjusting image data derived at least in part from operation of a camera, the image data being continually adjusted in real-time at least in part in response to the weather data or the runway light information.

19. The vision system of claim 18, further comprising:
means for receiving a weather report and providing the weather data; and means for displaying an image in response to the image data.

20. The vision system of claim 18, wherein the camera includes a color wheel or a spectral filtering arrangement and the color wheel or the filtering arrangement-is set according to the runway light information.

* * * * *